(12) United States Patent
Trimmer et al.

(10) Patent No.: US 7,182,308 B2
(45) Date of Patent: Feb. 27, 2007

(54) CONCRETE FORM CONNECTING APPARATUS

(75) Inventors: Douglas E. Trimmer, Oak Grove, MO (US); Danny R. Dugger, Lee's Summit, MO (US); Dwight E. Hibbs, Kansas City, MO (US); Launnie Kelmel, Lee's Summit, MO (US); James L. Brockman, Kansas City, MO (US)

(73) Assignee: Precise Forms, Inc., Bates City, MO (US)

( * ) Notice: Subject to any disclaimer, the term of this patent is extended or adjusted under 35 U.S.C. 154(b) by 59 days.

(21) Appl. No.: 10/651,712

(22) Filed: Aug. 29, 2003

(65) Prior Publication Data

US 2005/0047855 A1 Mar. 3, 2005

(51) Int. Cl.
*E04G 17/00* (2006.01)
*E05C 1/14* (2006.01)

(52) U.S. Cl. .................... 249/196; 249/210; 292/64; 292/66

(58) Field of Classification Search .............. 249/44, 249/45, 47, 191, 192, 195, 196, 207, 210, 249/219.1; 403/286, 315, 316, 317, 318, 403/335, 336, 337, 338, 408.1; 292/139, 292/247, 71, 63, 64, 66, 109, 65, 67, 192
See application file for complete search history.

(56) References Cited

U.S. PATENT DOCUMENTS

| | | | | |
|---|---|---|---|---|
| 126,907 A * | 5/1872 | Skinner | ................ | 292/65 |
| 706,845 A * | 8/1902 | McBride | ................ | 292/66 |
| 737,950 A * | 9/1903 | McCann | ................ | 249/195 |
| 1,119,712 A * | 12/1914 | Meserve | ................ | 249/195 |
| 1,301,260 A * | 4/1919 | Heinemann | ................ | 292/66 |
| 1,458,399 A * | 6/1923 | Fairley | ................ | 249/219.1 |
| 1,987,076 A * | 1/1935 | Pulis | ................ | 269/47 |
| 2,062,176 A * | 11/1936 | Hennigan | ................ | 292/64 |
| 2,113,086 A * | 4/1938 | Jennings | ................ | 249/196 |
| 2,502,849 A * | 4/1950 | Jennings | ................ | 249/219.1 |
| 3,169,294 A * | 2/1965 | Bonin et al. | ................ | 249/196 |
| 3,550,898 A * | 12/1970 | Citrullo et al. | ................ | 249/195 |
| 3,751,949 A * | 8/1973 | Castle | ................ | 292/66 |
| 4,218,081 A * | 8/1980 | Johnson | ................ | 292/66 |
| 4,643,469 A * | 2/1987 | Johnston et al. | ................ | 292/66 |
| 5,174,909 A * | 12/1992 | Ward | ................ | 249/44 |

(Continued)

*Primary Examiner*—Michael Safavi
(74) *Attorney, Agent, or Firm*—Hovey Williams LLP

(57) ABSTRACT

An assembly (20) for releasably interconnecting a pair of concrete form panels (22, 24) having adjacent, apertured walls (30) is provided which completely eliminates loose parts and significantly reduces panel setup and knock-down times. The assembly (20) includes an elongated pin (38) axially shiftable between extended and retracted positions, as well as an elongated connection arm (88) of length to bridge the adjacent walls (30) and engage the remote surface of the wall (30). An operating mechanism (42) is operatively coupled with pin (38) and arm (88). A latch assembly (96) serves to releasably maintain the pin (38) and arm (88) in their respective positions. Preferably, the pin 38 is mounted on a body (36) shiftable along a track (46); the latch assembly (96) is also supported on the body (36) to insure that the operating mechanism (42) can be properly latched in the retracted and extended positions of the pin (38). Also, the pin (38) is pivotally secured to the body (36) so that the pin (38) may be selectively pivoted from its normal operative position to a clearance position transverse to the axes of the openings (30).

16 Claims, 5 Drawing Sheets

U.S. PATENT DOCUMENTS 5,282,603 A * 2/1994 Taraldsson ................. 249/192
5,759,429 A * 6/1998 Trimmer et al. ............ 249/196
6,767,154 B1 * 7/2004 Schwoerer ................... 249/47
6,854,774 B2 * 2/2005 Magnusson .................. 292/66

* cited by examiner

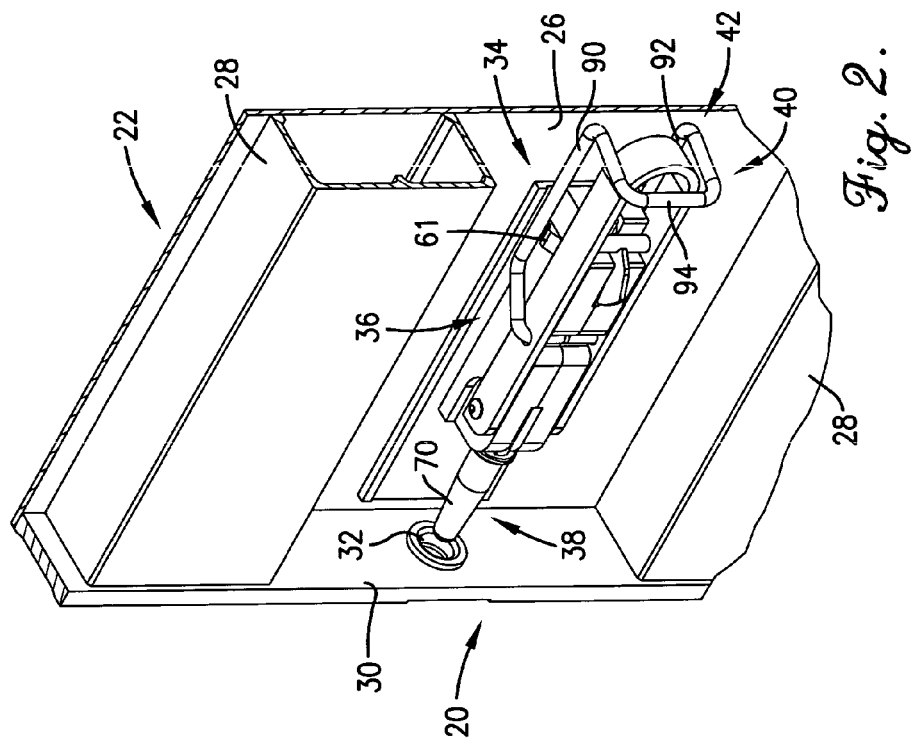
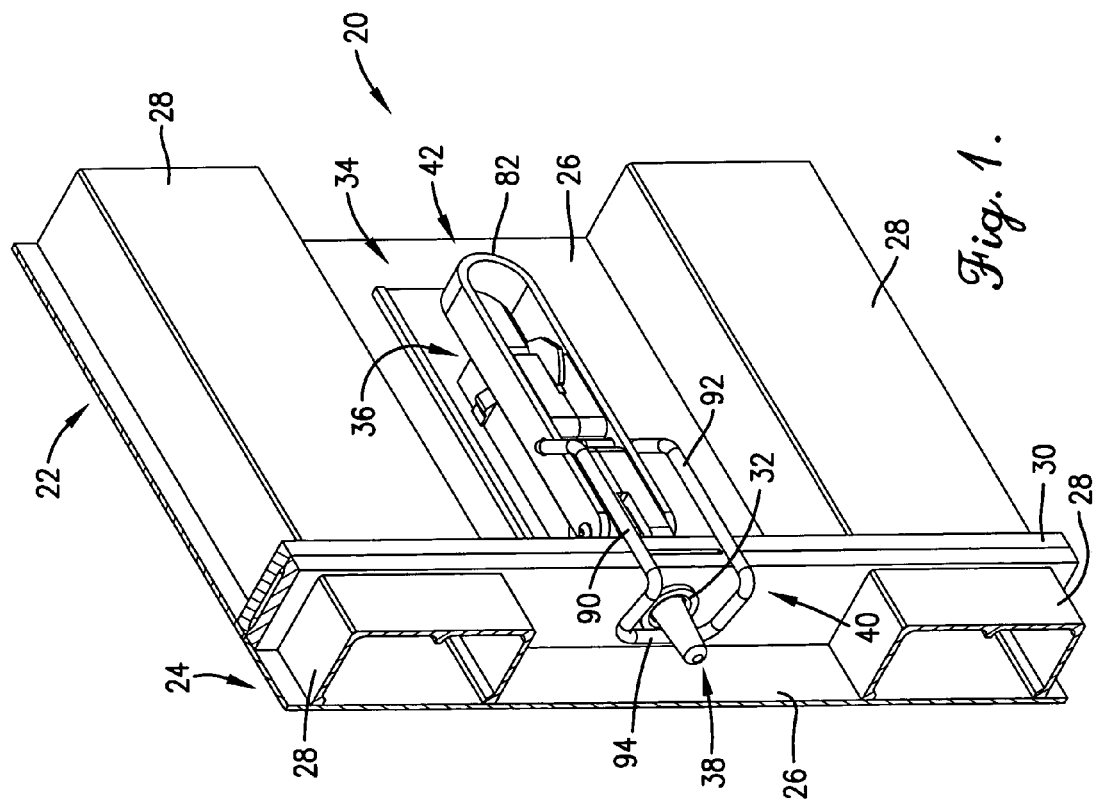

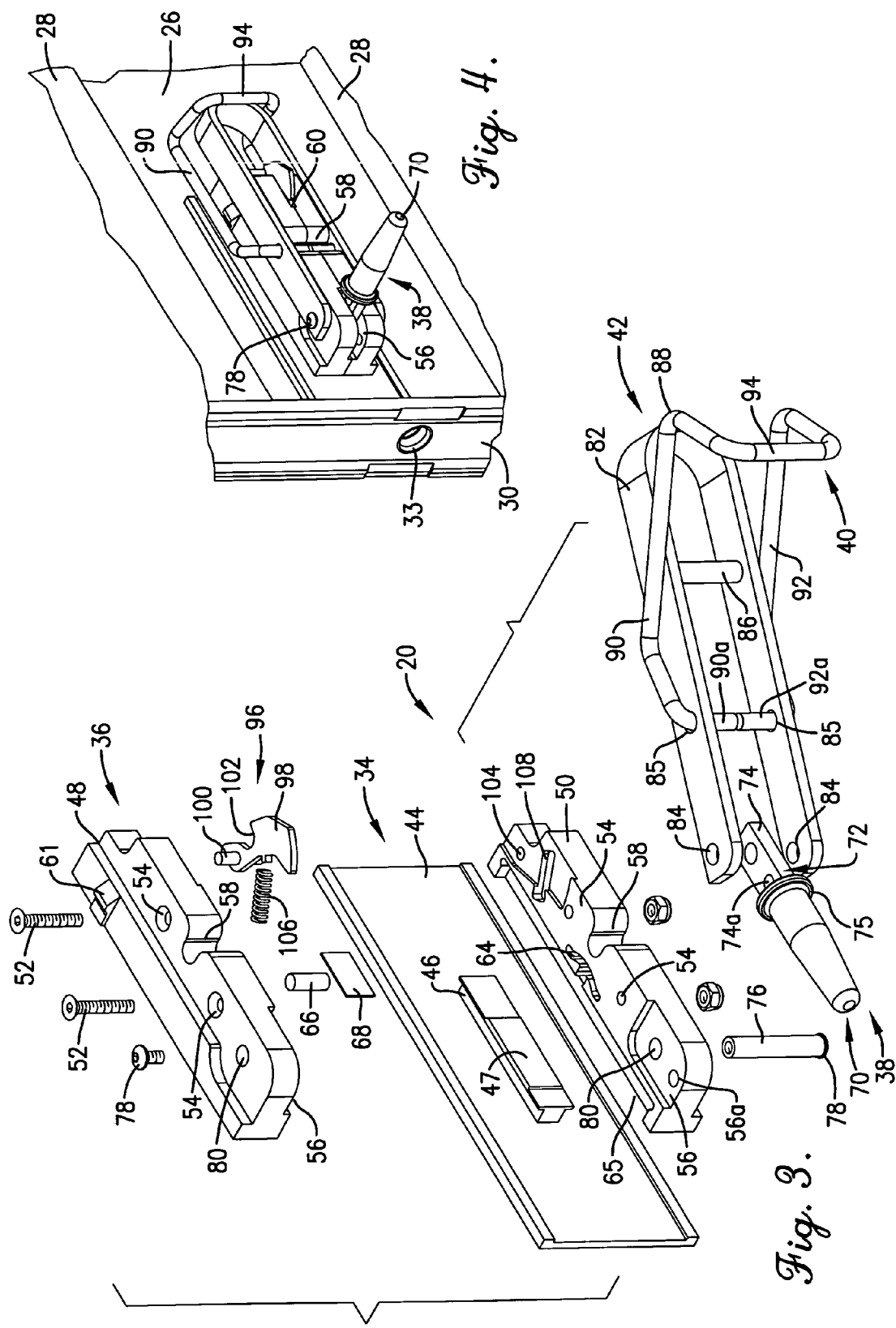

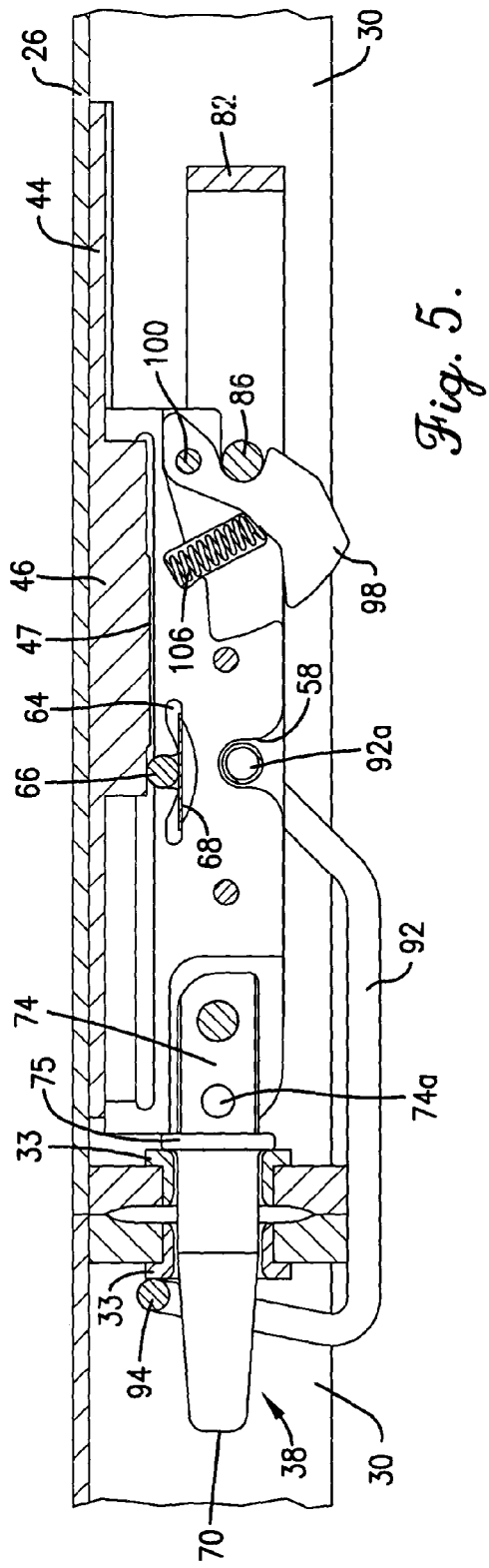
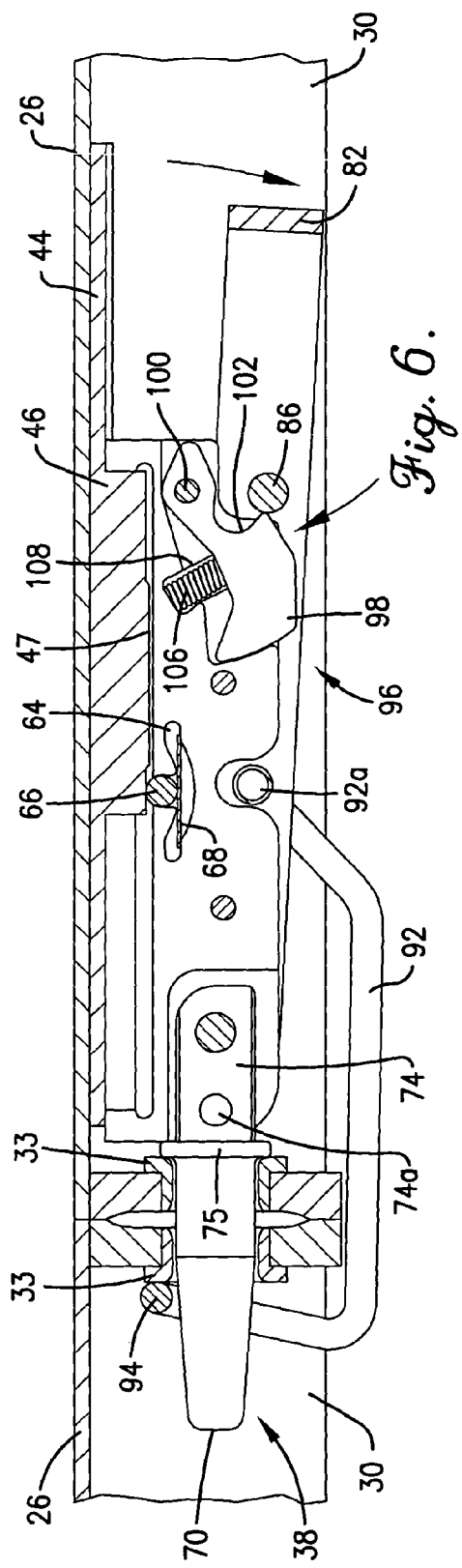

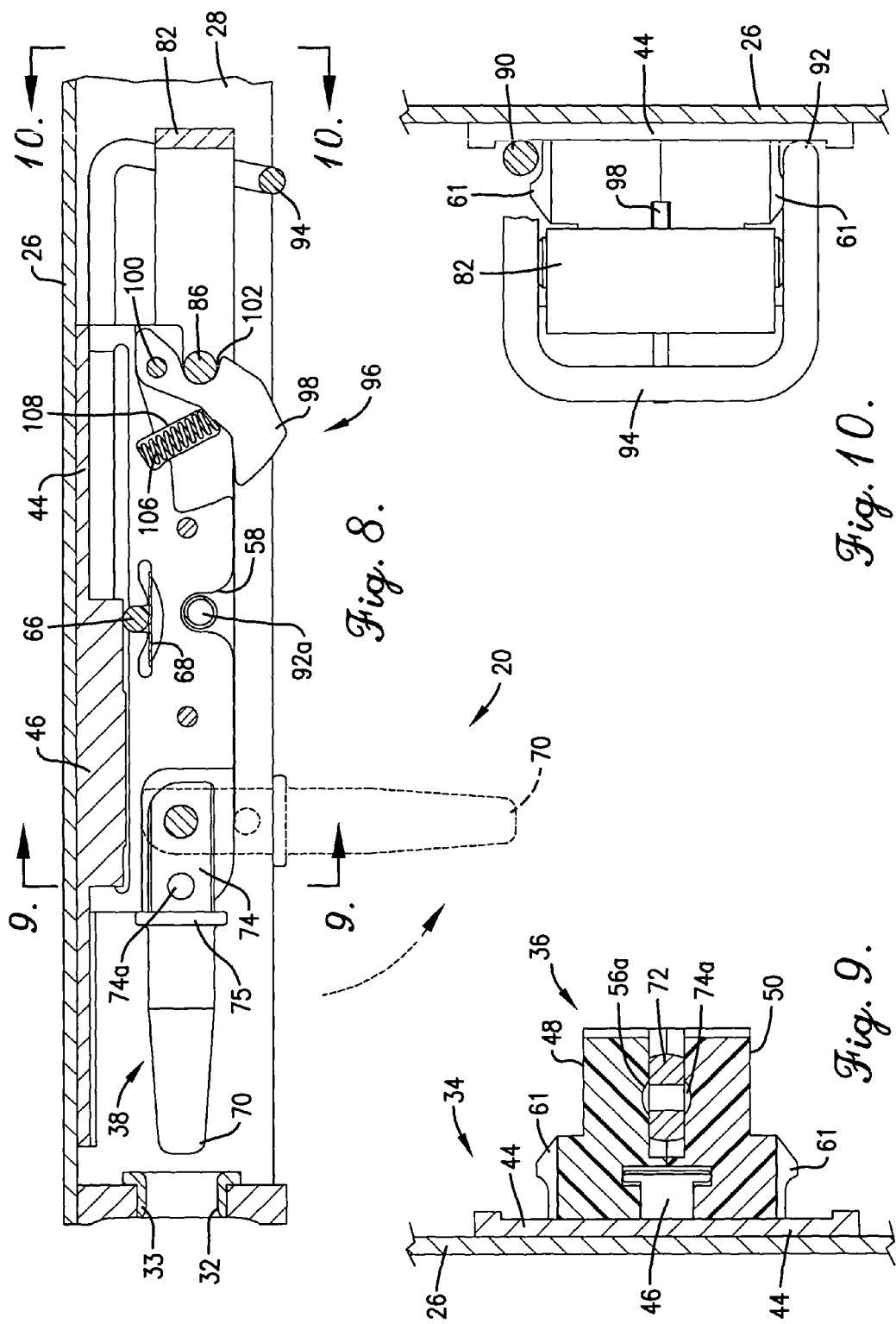

CONCRETE FORM CONNECTING APPARATUS

BACKGROUND OF THE INVENTION

1. Field of the Invention

The present is broadly concerned with an improved connector pin assembly of the type used for releasably interconnecting a pair of adjacent panels such as concrete form panels. More particularly, the invention is concerned with such a pin assembly wherein the pin is pivotally mounted to a supporting body, the latter being shiftable along a track; the body also supports a latch assembly. The pin is pivotal and required between its normal use position and a clearance position.

2. Description of the Prior Art

Many present day poured concrete structures are constructed using prefabricated, reusable, interlocking form sections or panels. These panels are necessarily of relatively high strength, yet preferably are compact and lightweight. Thus, concrete form panels are advantageously constructed from aluminum, and are designed to be interconnected end-to-end as well as in opposed relationship, to present a wall form for example. For purposes of end-to-end interconnection, the panels generally include vertically extending end walls having a series of spaced openings therethrough. When placed in juxtaposition with the end wall apertures in alignment, the individual panels are typically interconnected by means of slotted pin and wedge assemblies. Thus, slotted pins are driven through aligned end wall apertures, and a wedge is then placed within the pin slot in order to lock the individual panels together. When the form is disassembled, the wedges are loosened and removed, and the pins extracted from the form panel apertures.

Use of traditional detached panel connection hardware presents a number of problems. First and foremost, many of the hardened pins and wedges are lost during the normal process of form construction and disassembly, simply because they are not permanently attached to a form panel. Moreover, use of this detached hardware can be labor-intensive, inasmuch as the panels must be held in alignment, while the connection hardware is first properly positioned and then driven into place.

In response to these problems, attempts have been made at developing pin assemblies which are permanently secured to the form panels. For example, U.S. Pat. No. 4,194,717 describes such an assembly wherein a pin or bolt is shiftably mounted adjacent the end wall of a form panel, and is adapted for passage through aligned end wall apertures for connection purposes. In addition, the pin includes a groove adjacent the rearward end thereof which is adapted to receive a locking wedge when the pin is in its retracted position, thereby maintain the pin in this position and allowing wedge clearance.

Another attached hardware system makes use of a tapered pin having a rearward extension received within a slide block, the latter carrying a synthetic resin disk designed to maintain the position of the locking pin relative to the panel end wall aperture. Here again, the pins are driven forwardly and passes through aligned panel apertures, and a tapered wedge is used to complete the panel interconnection.

One drawback of these prior designs stems from the fact that they are not readily retrofittable, requiring welded-on attachments to the individual form panels. Furthermore, they relatively heavy, which is significant when it is considered that a large number of forms are typically transported to a construction site. Finally, these designs suffer from the fact that, owing to normal pin wear, the pins can become significantly misaligned or subject to "wobble." This is objectionable not only because the installer must manually align the pins before panel connection can be completed, but also because such misaligned pins may prevent or interfere with stacking and handling of detached panels.

In response to these problems, a greatly improved connector pin assembly described in U.S. Pat. No. 5,251,868 was developed. This patented structure makes use of an axially tapered, slotted pin together with a resilient metallic retaining ring coupling the pin to a form panel. In this fashion, the pin is permanently secured to the form and can be readily driven through aligned form wall apertures. The interconnection is complete through the use of a wedge driven into the pin slot. While the assembly described in the '868 patent represents a significance advancement in the art, it does not entirely eliminate extraneous loose parts, i.e., the wedge forming a part of the assembly is not connected to a form and is thus subject to loss.

All known prior interconnecting assemblies also require that the forms to be interconnected be in very close proximity to each other (e.g., normally within about ¼–½ of an inch); otherwise, when the pin is driven through the apertures, there is insufficient open slot in the pin to accept a wedge. Thus, use of prior interconnecting assemblies is relatively labor-intensive, because of the need to very closely position and align the forms prior to the actual interconnection thereof.

Another significantly improved connection structure is disclosed in U.S. Pat. No. 5,759,429. This connection assembly entirely eliminates loose parts and permits interconnection of relatively widely spaced or even slightly misaligned panels. The '429 patent discloses a latching assembly which is fixed relative to the movable pin, and the pin itself is secured to the panel connection wall. In actual use of connection systems in accordance with this patent, it has sometimes been found that latching of the operating mechanism can be difficult owing to the fact that the latch is fixed. Thus, if there are dimensional irregularities between the panels to be interconnected, it may be difficult or impossible to effect latching. In addition, because of the fact that the pins are secured to the connection walls in the '429 patented arrangement, care must be taken to insure that the panels are arranged such that pin assemblies are not in direct opposition. As can be appreciated, if two panel sections are placed in juxtaposition with directly opposed pin assemblies, neither pin assembly can be used because of the presence of the opposing pin assembly.

There is accordingly a need in the art for an improved panel interconnection assembly which overcomes the problems associated with the assemblies disclosed in U.S. Pat. No. 5,759,429, and particularly the problem of a fixed latch and connection wall-mounted pin assemblies.

SUMMARY OF THE INVENTION

The present invention overcomes the problems outlined above, and provides an assembly for releasably interconnecting first and second panels presenting corresponding adjacent walls having respective, generally aligned apertures therethrough. The assembly is adapted to be supported on the first panel proximal to the first wall and is used to interconnect the two panels. Broadly speaking, the preferred connection assembly includes an elongated pin presenting a forward end and a rearward end and axially shiftable between a retracted position where the forward end of the pin is proximal to the aperture through the first wall, and an extended connecting position wherein the pin extends through the apertures of both of the first and second walls. A connection arm mechanism is also provided which is selectively movable between a retracted position aid an extended, bridging position engaging the remote surface of the second wall. An operating mechanism may also be used, which operatively coupled with the pin and connection arm mechanism. Finally, a latch is provided which is movable with the pin and oriented for receiving a portion of the arm mechanism when the pin is in either the retracted position or the extended connecting position.

In preferred forms, the assembly includes a body which is mounted on the first panel and shiftable thereon; the connecting pin is supported by the body along with the connection arm mechanism, operating mechanism and latch. By virtue of this construction, there is no relative movement between the latch and pin and the intermediate mechanisms. Accordingly, latching can be accomplished notwithstanding any dimensional irregularities in the panel or the like.

Additionally, the pin is preferably pivotally supported on the shiftable body. In this way, the pin can be moved to a clearance position transverse to the longitudinal axes of the connection apertures, when the body is in its retracted position. Therefore, if a pair of panels are placed in adjacency with directly opposing connection assemblies on each panel, one of the assemblies can be moved to its retracted position, and the associated pin pivoted to its clearance position. Thereupon, the opposing assembly can be used in the normal fashion.

BRIEF DESCRIPTION OF THE DRAWINGS

FIG. 1 is a fragmentary perspective view illustrating a pair of concrete form panels operatively interconnected using the connection apparatus of the invention;

FIG. 2 is a fragmentary perspective view depicting a concrete form panel supporting the preferred connection apparatus, with the latter shown in its retracted, non-bridging position;

FIG. 3 is a perspective exploded view depicting the components making up the preferred connection apparatus;

FIG. 4 is a fragmentary perspective view of a concrete form panel supporting the preferred connection apparatus, with the latter being shown in its retracted position, and with the connection pin thereof in its outwardly extending clearance position;

FIG. 5 is a fragmentary vertical sectional view illustrating a pair of adjacent concrete form panels interconnected by means of the preferred connection apparatus;

FIG. 6 is a view similar to that of FIG. 5, but showing the connection apparatus during the initial stage of release thereof;

FIG. 8 is a view similar to that of FIG. 7, but showing the connection apparatus in its fully retracted position and also illustrating in phantom the clearance position of the connection pin;

FIG. 9 is a vertical sectional view taken along line 9—9 of FIG. 8; and

FIG. 10 is a sectional view taken along line 10—10 of FIG. 8.

DETAILED DESCRIPTION OF THE PREFERRED EMBODIMENT

Figure 7:
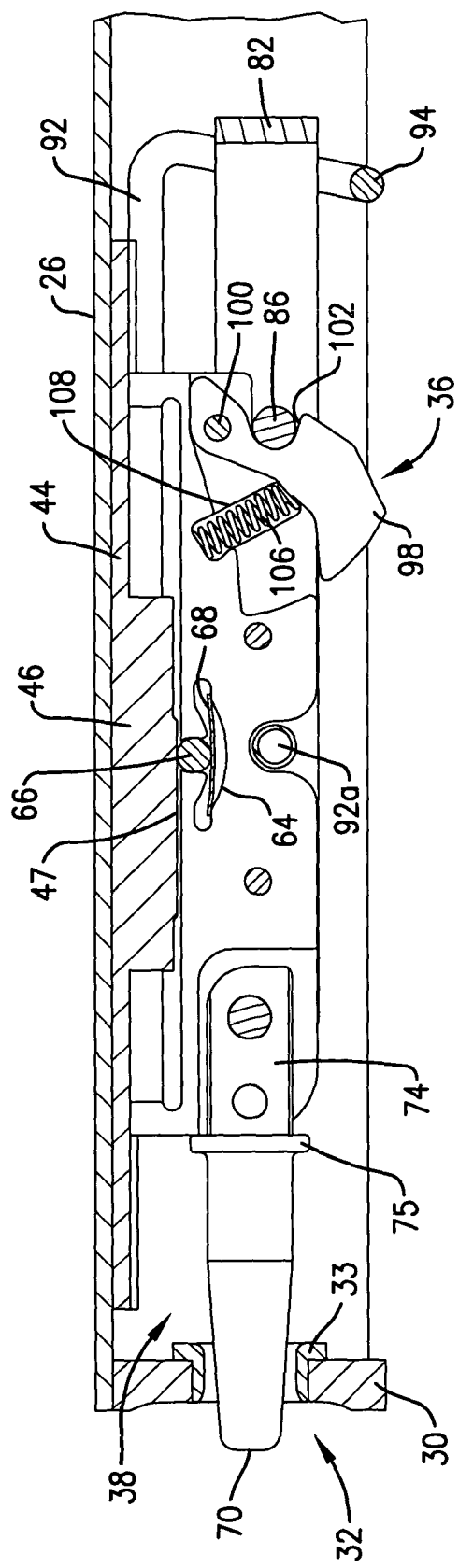
FIG. 7 is a view similar to that of FIG. 6, but showing the connection apparatus during retraction of the connection pin thereof.

Turning now to the drawings, a panel interconnecting assembly 20 is illustrated. In FIGS. 1 and 2, the assembly 20 is shown in its locking and retracted positions respectively. As explained in detail below, the assembly 20 is especially adapted for selected interconnection of a pair of panels 22 and 24, most especially concrete form panels.

The panels 22, 24 are themselves conventional and each includes a primary, essentially planar panel segment 26, laterally extending reinforcing beams 28 and transverse end-mounted connection walls 30. The walls 30 are provided with a series of vertically spaced apart apertures 32 defined by attached grommets 33, permitting interconnection of the panels 22, 24 by means of the assemblies 20. Typically, the panels 22, 24 are formed of welded-together aluminum components.

A given panel 22 or 24 may be equipped with a series of connection assemblies 20, with each such assembly being in general alignment with a corresponding connection wall aperture 32. Broadly speaking, each such assembly 20 includes a base plate 34, a two-piece shiftable nylon body 36, and elongated pin 38, a connector arm mechanism 40 and an operating mechanism 42.

The base plate 34 is in the form of a elongated, substantially rectangular aluminum web 44 adapted for welding or other connection to the primary panel segment of a panel. The outer surface of the web 44 includes an elongated, outwardly extending, generally T-shaped track 46; as illustrated in FIG. 3, the outer surface of track 46 includes an elongated, projecting slide surface 47.

The body 36 is preferably formed of two molded, mating body halves 48, 50 which are secured together via threaded fasteners 52 extending through aligned bores 54. The halves 48, 50 are configured to cooperatively present a forward pin-receiving slot 56, opposed detent recesses 56a, a transverse recess 58, and a rear slot 60, with each body half having a rearward, outwardly extending cam lock 61. As best seen in FIGS. 3 and 5–6, the body halves 48, 50 include lowermost, somewhat T-shaped openings 62, 64, and cooperatively define a lowermost elongated slot 65. A roll pin 66 is located within and extends between the body halves 48, 50 within the lower extent of the respective openings 62, 64. The pins 66 is retained by means of an upper spring plate 68 which is likewise received within the openings 62, 64. As best seen in FIGS. 5 and 6, the pin 66 rides on the outer surface of track 46 and surface 47.

The connection pin 38 includes a tapered forward end 70, a rearward end 72 in the form of a rearwardly, apertured tang 74 equipped with a detent rivet 74a, and intermediate annular abutment 75. The tang 74 is received within the forward slot 56 of body 36 and is secured therein by means of a tubular, internally threaded coupler 76 and end-mounted screws 78. The coupler extends through mating bores 80 formed in the body halves 48, 50.

The locking arm mechanism 40 and operating mechanism 42 are interconnected and are coupled to body 36. In particular, the operating mechanism 42 includes an elongated, somewhat U-shaped handle 82 having inner connection openings 84, intermediate arm-receiving openings 85, and a rigid crosspiece 86. The handle 82 is pivotally secured to the body 36 by attachment to the respective ends of coupler 76, i.e., the ends of the coupler extend through the handle openings 84 with the heads of screws 78 engaging the handle legs to complete the connection. Locking arm mechanism 40 is preferably in the form of an elongated, bifurcated arm 88 presenting a pair of dogleg segments 90, 92 and an outer bight 94. The inner ends 90a, 92a of the segments 90, 92 are inturned and are received within the opposed handle openings 85.

The body 36 also carries a latch assembly 96. This includes a latch plate 98 having a pivot pin 100 and a latching notch 102. The opposed ends of the pin 100 are received within complemental bores 104 formed in the rearward end of body halves 48, 50. A latching spring 106 is seated within an elongated, oblique slot 108 cooperatively formed within the body 36 by the halves 48, 50 and engages the underside of latching plate 98, biasing it outwardly.

The body 36, with supported pin 38, locking arm mechanism 40, operating mechanism 42 and latching assembly 96, is shiftable between the retracted position depicted in FIG. 2 and an extended connecting position shown in FIG. 1. In each such position, the latching assembly 96 is operable to retain a portion of the operating mechanism 42, namely crosspiece 86. Inasmuch as the latching assembly is shiftable with the body 36, it will be appreciated that the mechanism 42 can be readily latched in place regardless of dimensional irregularities or the like in the panels 22, 24.

Referring next to FIGS. 2 and 8, the orientation of assembly 20 in its retracted position is illustrated in detail. In this position, body 36 is shifted rearwardly to its maximum extent such that roll pin 66 is located adjacent the rearmost end of track 46. Also, the handle 82 is latched in place, i.e., crosspiece 86 is received within notch 102 of spring-biased latching plate 98. The inturned ends 90a, 92a of the segments 90, 92 are received within recess 58, and the dogleg segments 90, 92 snap over and are retained by the cam locks 61. In this configuration, the assembly 20 presents a compact design which does not interfere with manipulation of the overall panel to which it is affixed.

However, it will also be observed that in the retracted position of FIGS. 2 and 8, the pin 38 may be selectively pivoted from the use position where the longitudinal axis of the pin is general alignment with the axes of the apertures 32, to a clearance position (shown in phantom in FIG. 8) wherein the pin axis is transverse to the aperture axes. Such pivoting can be done manually and involves unseating of the rivet 74a from the detent recesses 56a and pivoting the pin to the FIG. 8 phantom line position. As such, the assembly 20 can be used with an adjacent panel having another connection assembly directly opposite the assembly 20. This is because the assembly 20 in the pin-retracted position provides sufficient clearance to allow the directly opposite assembly 20 on the adjacent panel to be employed.

Referring to FIGS. 2 and 8, when it is desired to utilize assembly 20 for connection of adjacent panels 22, 24, the assembly 20 is moved forwardly by striking the end of handle 82 with a hammer, so that pin 38 protrudes fully through the adjacent opening 32 and at least partially into and through the opening 32 on the proximal panel 24. The arm 88 is then grasped and pulled outwardly, causing the segments 90, 92 to release from the cam locks 61. Next, the handle 82 is grasped and pulled outwardly while depressing plate 98, causing release of the crosspiece 86. At this point, both handle 82 and arm 88 are freely pivotal relative to the body 36. Arm 86 is then pulled forwardly until it bridges the adjacent walls 30 of the panels 22, 24 and engages the remote surface of the wall 30 of panel 24 beneath aperture 32. This of course causes forward pivoting of the handle 82 as well. When the arm 88 is so positioned, the handle 82 is pivoted rearwardly causing the walls 30 into compression to achieve a tight interconnection thereof. At the same time, the arm 88 aid handle 82 are fully pivoted rearwardly to again assume the locked position thereof shown in FIGS. 2 and 8.

In order to disconnect the assembly 20 and return it to the retracted position thereof, the handle 82 is grasped and rotated forwardly by appropriate manipulation of plate 98. This allows the arm 88 to clear the protruding pin 38 and be rotated rearwardly along the handle 82 to the locked FIG. 2 position thereof. The protruding pin 38 is then struck with a hammer, causing the body 36 to shift rearwardly (see FIG. 7). If the assembly 20 is not fully retracted by such action, an additional hammer blow on the handle 38 may be employed to fully move the assembly 22 in its retracted position.

U.S. Pat. No. 5,759,429 is incorporate by reference herein.

We claim:

1. An assembly for releasably interconnecting first and second panels presenting first and second adjacent walls having respective, generally aligned apertures therethrough, said assembly adapted to be supported on said first panel proximal to said first wall, said assembly comprising:

an elongated pin presenting a forward end and a rearward end and axially shiftable between a retracted position where the forward end of the pin is proximal to the aperture through said first wall, and an extended connecting position wherein the pin extends through the apertures of both of said first and second walls;

connection arm mechanism selectively movable between a retracted position and an extended, bridging position engaging said second wall; and a latch movable with said pin and oriented for latching of said connection arm mechanism when the pin is in either said refracted position or said extended bridging position.

2. The assembly of claim 1, said connection arm mechanism comprising an elongated connection arm having a forward end and a rearward end and of length sufficient to bridge said first and second walls, said arm being selectively movable between a retracted, non-bridging position, and an extended position where the arm bridges said first and second walls and said forward end engages said second wall.

3. The assembly of claim 2, including operating mechanism comprising a pivotal handle and means pivotally connecting said arm to said handle, said handle being movable in a direction for movement with said arm in a direction to draw said first and second walls into compression.

4. The assembly of claim 3, the forward end of said arm presenting a bight segment engage able with said second wall, said pin extending through said bight segment when the pin is in said extended connecting position thereof.

5. The assembly of claim 4, there being a pair of spaced arm sections extending from said bight segment, the ends of said arm sections remote from said bight section being coupled with said operating mechanism.

6. The assembly of claim 1, including a body supporting said pin, said latch being mounted on said body for shifting therewith.

7. The assembly of claim 6, including a base plate adapted for connection to said one wall, said body being shiftably mounted on said base plate.

8. The assembly of claim 1, said pin being pivotal between a use position in general alignment with the axes of said apertures and a clearance position where said pin is transverse to said axes.

9. An assembly for releasably interconnecting first and second panels presenting first and second adjacent walls having respective, generally aligned apertures therethrough, said assembly adapted to be supported on said first panel proximal to said first wall, said assembly comprising:

an elongated pin presenting a forward end and a rearward end and axially shiftable along a path of travel lying in a vertical plane and between a retracted position where the forward end of the pin is proximal to the aperture through said first wall, and an extended connecting position wherein the pin is oriented to extend through the apertures of both of said first and second walls, said pin being pivotal between a use position in general alignment with the axes of said apertures and within said vertical plane, and a retracted position where said pin is transverse to said axes and said vertical plane; and a connection arm mechanism comprising an elongated connection arm having a forward end and a rearward end and of length sufficient to bridge said first and second walls, said arm being selectively movable between a retracted, non-bridging position, and an extended position where the arm bridges said first and second walls and said forward end engages said second wall.

10. The assembly of claim 9, including operating mechanism comprising a pivotal handle and means pivotally connecting said arm to said handle, said handle being movable in a direction for movement of said arm in a direction to draw said first and second walls into compression.

11. The assembly of claim 9, the forward end of said arm presenting a bight segment engage able with said second wall, said pin extending through said bight segment when the pin is in said extended connecting position thereof.

12. The assembly of claim 9, including a shiftable body supporting said pin.

13. The assembly of claim 12, including a base plate adapted for connection to said one wall, said body being shiftably mounted on said base plate.

14. An assembly for releasably interconnecting first and second panels presenting first and second adjacent walls having respective, generally aligned apertures therethrough, said assembly adapted to be supported on said first panel proximal to said first wall, said assembly comprising:

a base plate adapted for connection to said first panel;
a body shiftably mounted on said base plate;
an elongated pin supported on said body for shifting therewith, said pin presenting a forward end and a rearward end and axially shiftable with said body between a refracted position where the forward end of the pin is proximal to the aperture through said first wall, and an extended connecting position wherein the pin extends through the apertures of both of said first and second walls;
connection arm mechanism selectively movable between a retracted position and an extended, bridging position engaging said second wall; and
a latch mounted on said body for shifting therewith, said latch movable with said pin and oriented for latching of said connection arm mechanism when the pin is in either said retracted position or said extended bridging position.

15. An assembly for releasably interconnecting first and second panels presenting first and second adjacent walls having respective, generally aligned apertures therethrough, said assembly adapted to be supported on said first panel proximal to said first wall, said assembly comprising:

an elongated pin presenting a forward end and a rearward end and axially shiftable between a retracted position where the forward end of the pin is proximal to the aperture through said first wall, and an extended connecting position wherein the pin extends through the apertures of both of said first and second walls, said pin being pivotal between a use position in general alignment with the axes of said apertures and a clearance position where said pin is transverse to said axes;
connection arm mechanism selectively movable between a retracted position and an extended, bridging position engaging said second wall; and
a latch movable with said pin and oriented for latching of said connection arm mechanism when the pin is in either said retracted position or said extended bridging position.

16. An assembly for releasably interconnecting first and second panels presenting first and second adjacent walls having respective, generally aligned apertures therethrough, said assembly adapted to be supported on said first panel proximal to said first wall, said assembly comprising:

an elongated pin presenting a forward end and a rearward end and axially shiftable between a retracted position where the forward end of the pin is proximal to the aperture through said first wall, and an extended connecting position wherein the pin is oriented to extend through the apertures of both of said first and second walls,
said pin being pivotal between a use position in general alignment with the axes of said apertures and a retracted position where said pin is transverse to said axes; and
connection arm mechanism comprising an elongated connection arm having a forward end and a rearward end and of length sufficient to bridge said first and second walls, said arm being selectively movable between a retracted, non-bridging position, and an extended position where the arm bridges said first and second walls and said forward end engages said second wall.

* * * * *